Dec. 7, 1965   N. MARFORIO   3,221,688
OVERLOCK SEWING MACHINE
Filed April 4, 1963   12 Sheets-Sheet 4

INVENTOR
Nerino Marforio,
BY Robert E. Burns
ATTORNEY

Dec. 7, 1965  N. MARFORIO  3,221,688
OVERLOCK SEWING MACHINE
Filed April 4, 1963  12 Sheets-Sheet 6
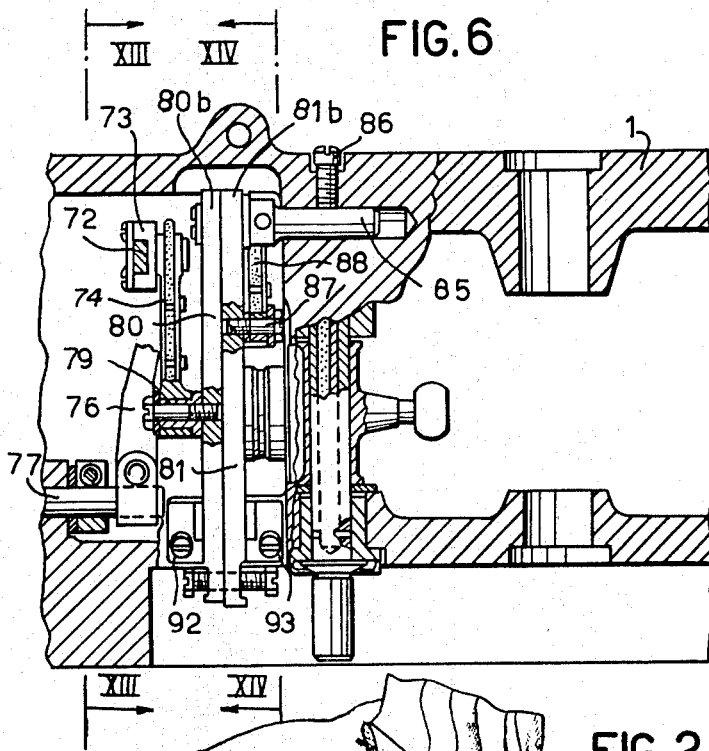
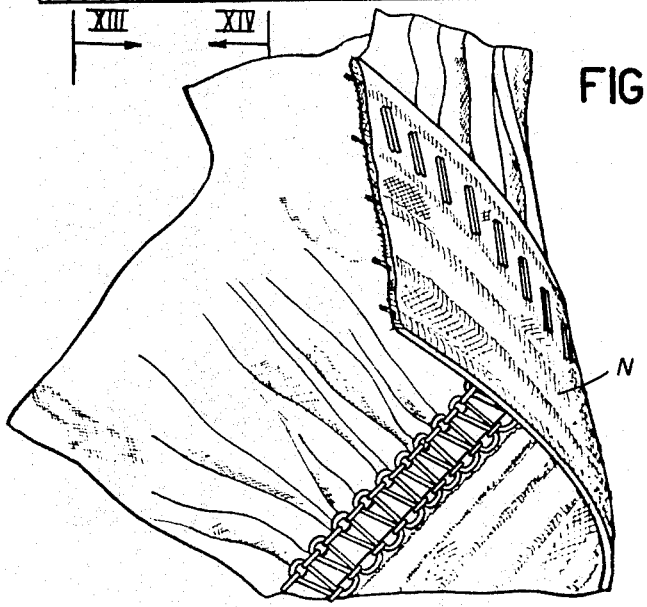
INVENTOR
Nerino Marforio,
BY
ATTORNEY

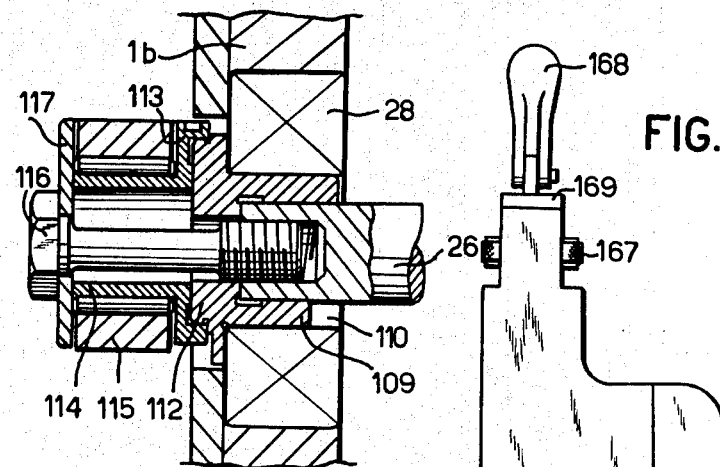
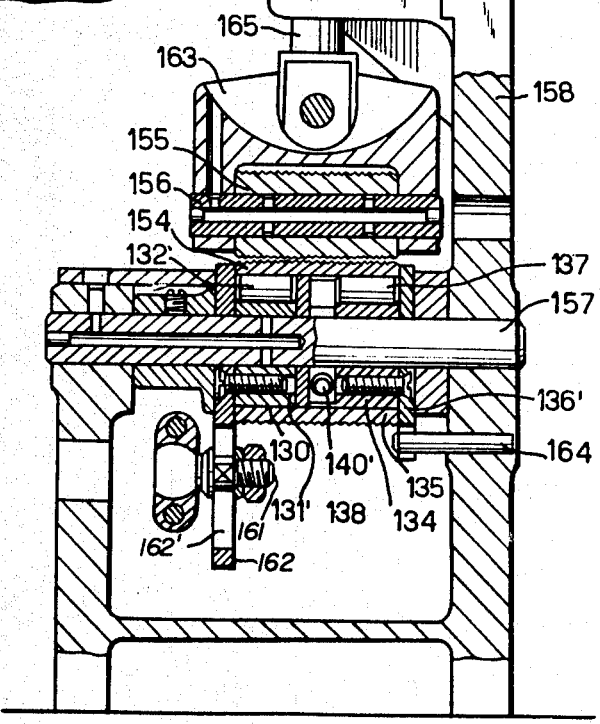

Dec. 7, 1965 N. MARFORIO 3,221,688
OVERLOCK SEWING MACHINE
Filed April 4, 1963 12 Sheets-Sheet 8
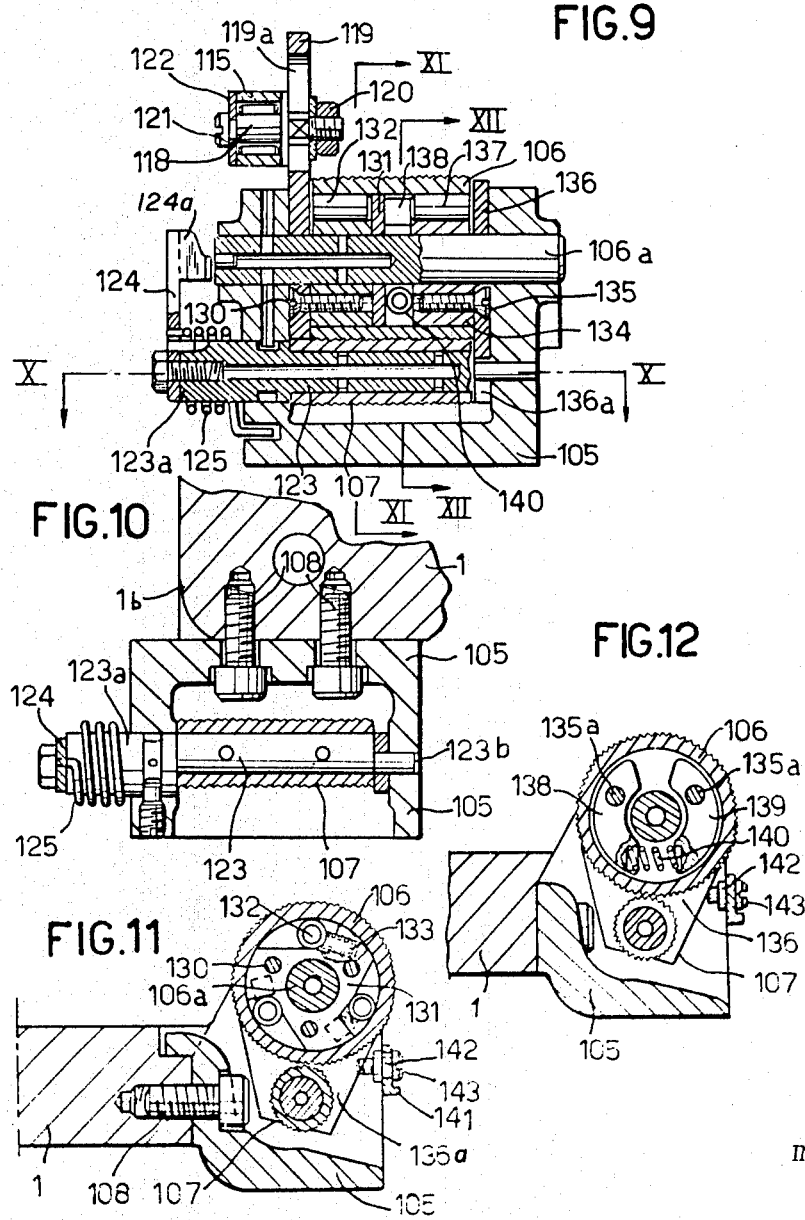
INVENTOR
Nerino Marforio,
BY
ATTORNEY

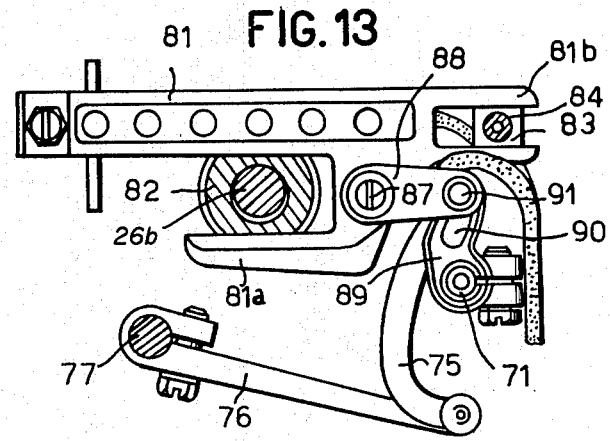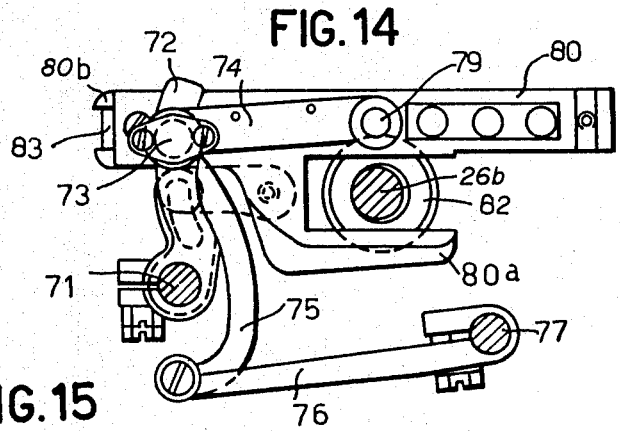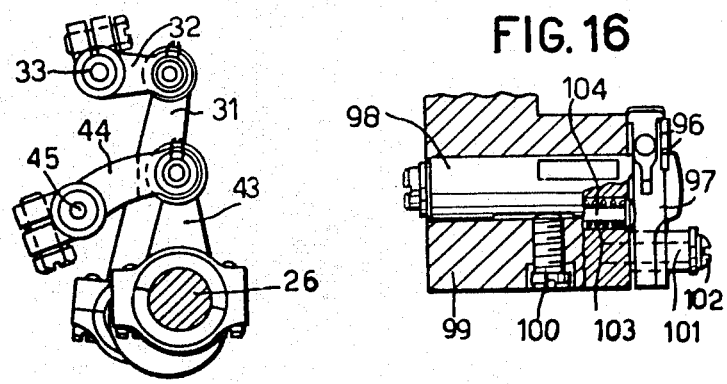

Dec. 7, 1965  N. MARFORIO  3,221,688
OVERLOCK SEWING MACHINE
Filed April 4, 1963  12 Sheets-Sheet 10
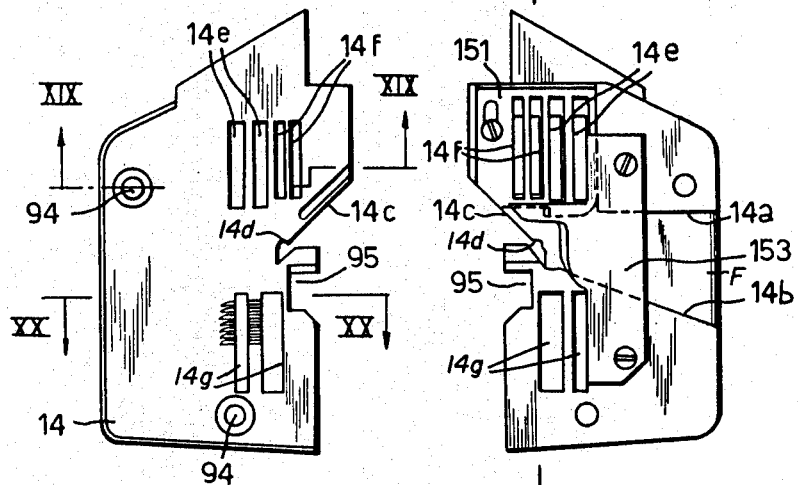
INVENTOR
Nerino Marforio,
BY *Robert E. Burns*
ATTORNEY

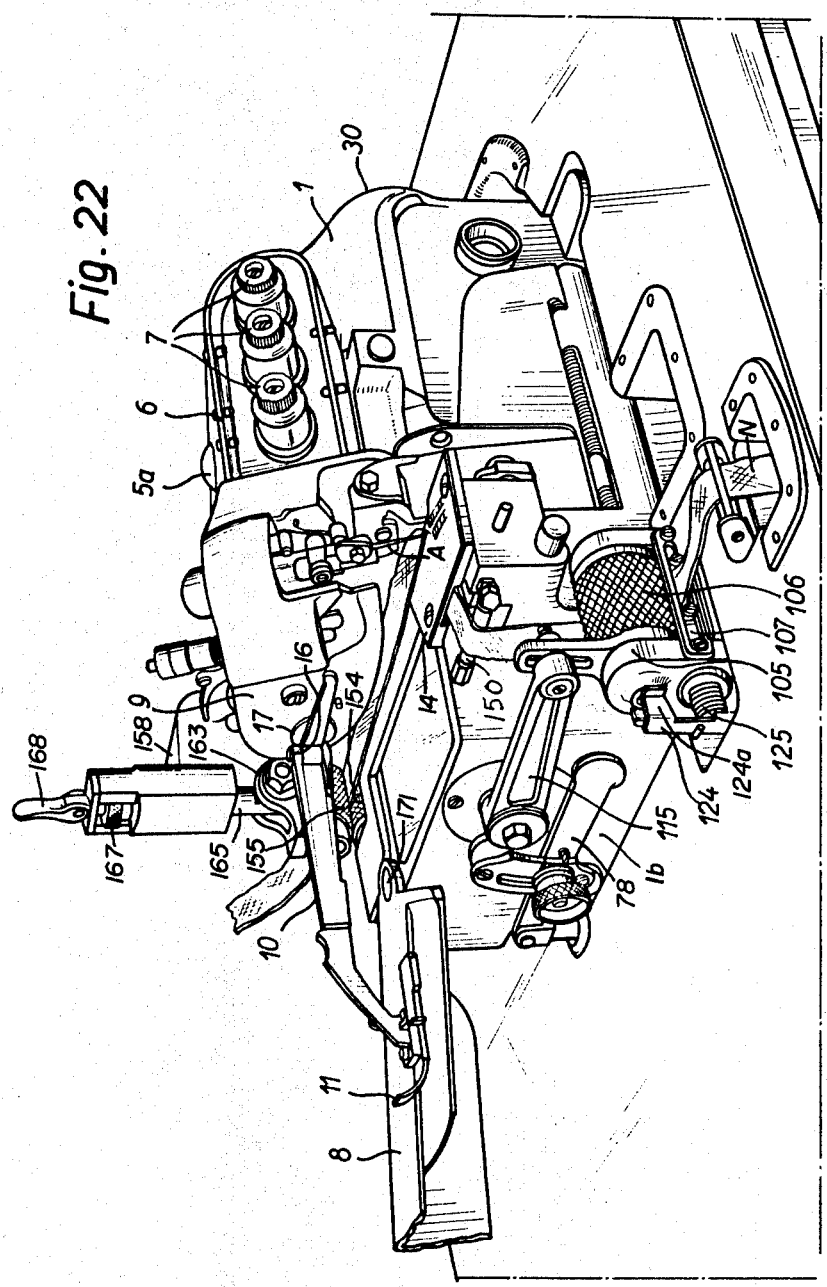

Dec. 7, 1965  N. MARFORIO  3,221,688
OVERLOCK SEWING MACHINE
Filed April 4, 1963  12 Sheets-Sheet 12

INVENTOR
Nerino Marforio,
BY
ATTORNEY

United States Patent Office 3,221,688
Patented Dec. 7, 1965

3,221,688
OVERLOCK SEWING MACHINE
Nerino Marforio, Milan, Italy, assignor to S.p.A. Virginio
Rimoldi & C., Milan, Italy
Filed Apr. 4, 1963, Ser. No. 270,568
Claims priority, application Italy, Apr. 12, 1962,
7,478/62
13 Claims. (Cl. 112—162)

This invention relates to an overlock sewing machine. Known overlock sewing machines are compact in structure and quick in operation and are provided with a device for cutting or trimming the fabric edges near the region on which the stitch is formed. Such machines differ from arm machines also in that the needle drive, the support for the top cutter of the cutting device and presser foot are supported by a vertical wall of the machine casing overlying the working table, over which the work is fed, and slightly spaced from the row of stitches being formed.

Two- or three-thread overlock sewing machines are known and widely used for interconnecting fabrics, more particularly knitted fabric edges, etc. With such machines the cutters of the cutting device trim the edge of the work being sewn before the stitch is formed.

It is moreover known that attachment of an elastic to men and ladies underwear was heretofore effected by employing two- or three-needle arm machines and a bottom looper, which are slow in operation, highly complicated and expensive. Formation of the stitch with such machines requires three or four threads.

This invention provides apparatus for attaching bands which are elastic or non-elastic and laces of small width to the edges of fabrics which are trimmed and hemmed by means of an overlock stitch seam on an overlock machine of the type referred to above.

More particularly, this invention provides for attaching bands or lace of small width to articles of wear, more particularly underwear, such as to the waist and legs of ladies' panties and other ladies' underwear, nightgowns and the like.

Another object of this invention is to provide for attaching an elastic to the abovementioned articles by using two threads only, namely a needle and a looper thread and effecting a flat seam more attractive than seams effected by arm machines.

According to this invention the machine is equipped with means adjusting feed and issue of a ribbon or band to and from the sewing and feed region, respectively, in such manner that the ribbon or lace are constantly maintained in a tensioned state during sewing and feed.

Such means comprises a feed device including a support secured to the lower left-hand portion of the machine frame, for a pair of milled ribbon feed rollers for the ribbon to be sewn to the fabric of which the article of wear is made. The top roller receives motion through a mechanism comprising two unidirectional couplings acting oppositely incorporated by the roller, while the bottom or counter roller is fulcrumed to an eccentric pivot and is biased by a spring in order to cause the band fed to the top driving roller to adhere thereto. The top roller receives intermittent pulses from the main shaft on the machine. To this end the shaft for the top or driving roller carries a lever provided with a longitudinal groove engaging a pivot articulated to the end of a link, the other end of which is mounted through the interposition of a needle bearing on an eccentric carried by the main shaft extending beyond the forward portion of the machine frame.

At the outlet of the sewn material from the working table a device is provided which comprises a pair of rollers, the lower roller being operated from the mechanism on the machine driving the feed dogs and is similar in structure to the driving roller of the feed device, while the top roller acts as an abutment roller and is pressed against its associated driving roller by an adjustable spring.

Other characteristic features and advantages of this invention will be clearly understood from the appended description referring by way of a non-limiting example to an embodiment shown on the annexed drawings, wherein:

FIGURE 6 is a section view taken on line VI—VI of FIGURE 3;

FIGURE 7 is a section view taken on line VII—VII of FIGURE 2 on an enlarged scale;

FIGURE 8 is a section view taken on line VIII—VIII of FIGURE 2;

FIGURE 9 is a section view taken on line IX—IX of FIGURE 2;

FIGURES 10, 11 and 12 are sectional views taken on lines X—X, XI—XI and XII—XII of FIGURE 9;

FIGURES 13, 14 are section views taken on lines XIII—XIII and XIV—XIV of FIGURE 6, limited to the operating means for the movement of the feed dog holder bar;

FIGURE 15 is a section view taken on line XV—XV of FIGURE 3;

FIGURE 16 is a section view taken on line XVI—XVI of FIGURE 2;

FIGURE 17 is a section view of the needle plate;

FIGURE 18 is a plan view of the needle plate from below;

FIGURES 19, 20 are similar section views taken on lines XIX—XIX and XX—XX, respectively, of FIGURE 17;

FIGURE 21 is a section view taken on line XXI—XXI of FIGURE 18;

FIGURE 22 is a diagrammatic perspective view of the machine showing the path between the forward and rear feed rollers of the band to be attached to the edge of an article of wear being sewn;

FIGURE 24 is a fragmentary view of a fabric section to the end of which an elastic has been attached by using the improved machine.

Corresponding parts are denoted throughout the figures by the same reference numerals.

Figure 1:
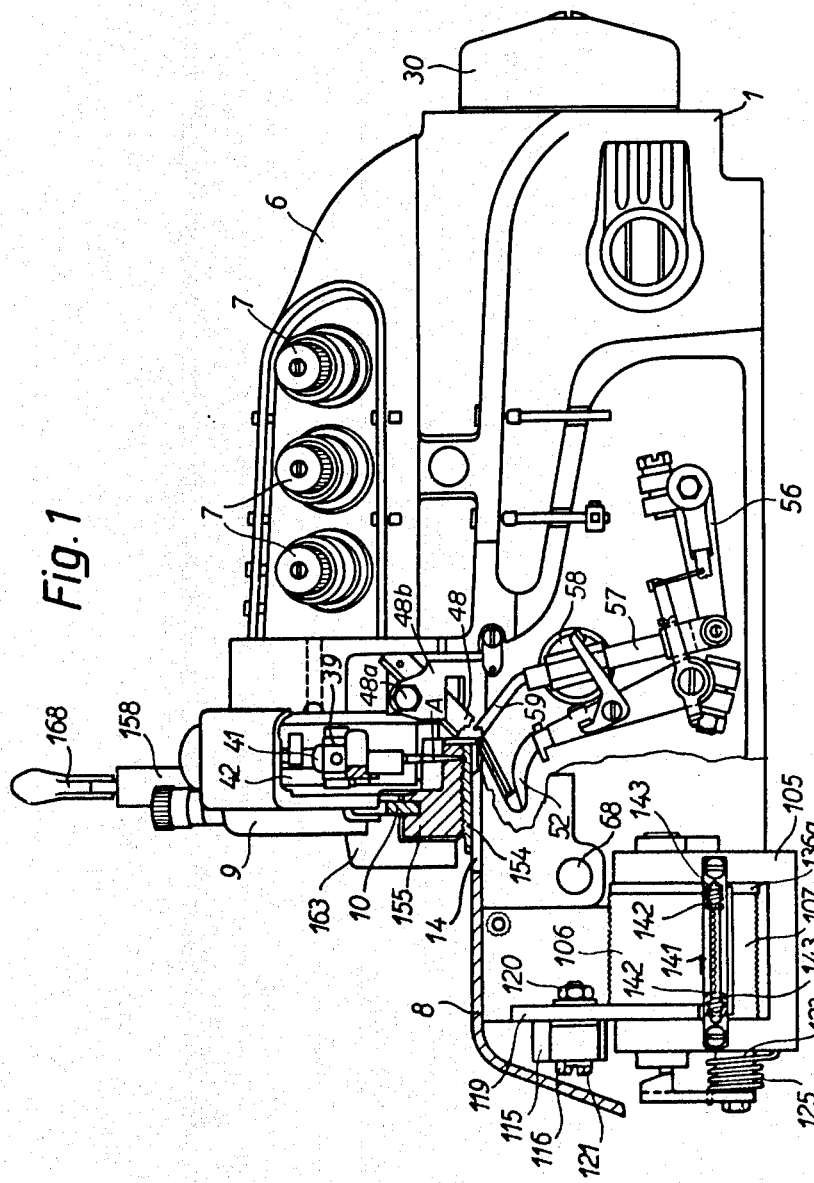
FIGURE 1 is a fragmentary front elevation partly in section of the improved machine.

The machine shown on the drawings comprises a frame 1 resting on a case 2 acting as a reservoir for collecting lubricating oil and incorporating the oil circulating pump, cleaner therefor and a shaft (not shown) to which a pulley 3 for driving the pump is keyed.

The frame 1 comprises a raised middle portion, the inside 4 of which opens toward the case 2 and the top of which is closed by a cover plate 5 of transparent material. The latter is protected, except for a small dome-shaped projection 5a by a metal cover plate 6 carrying externally adjustable thread tensioning devices 7.

Figure 3:
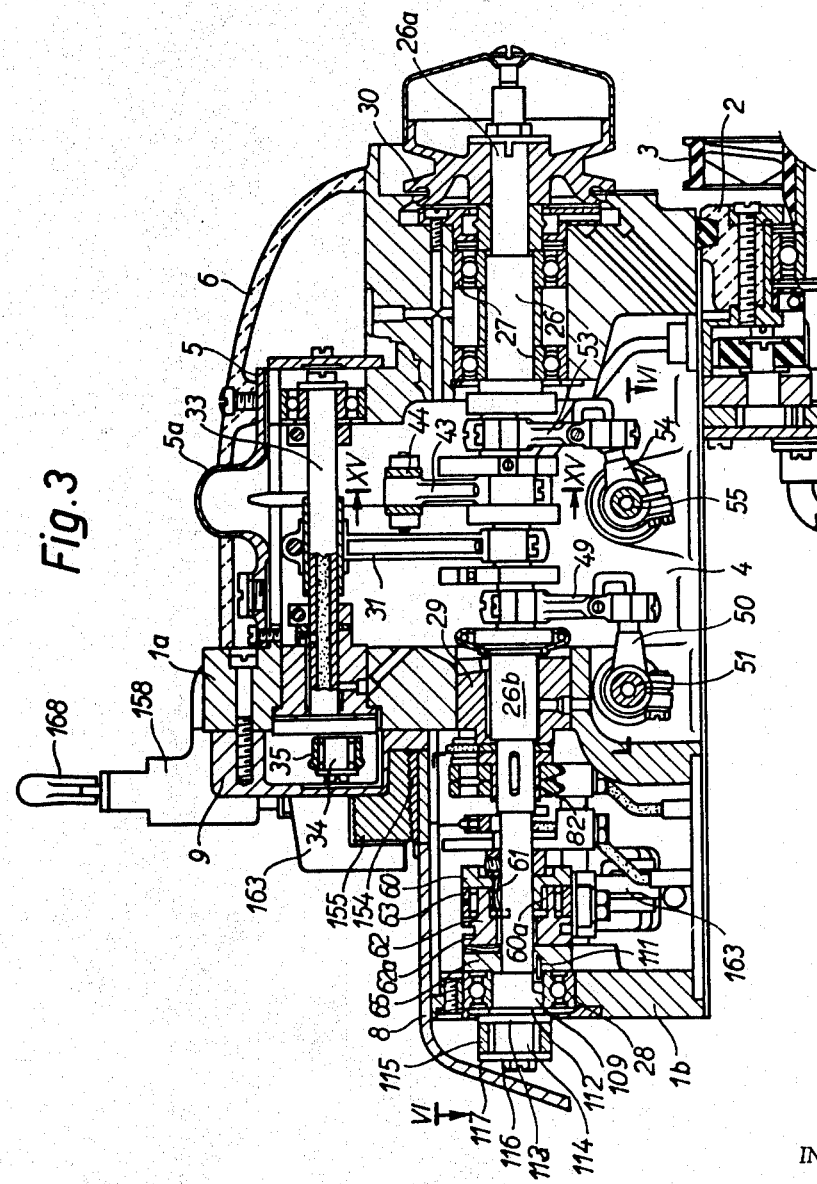
FIGURE 3 is a median longitudinal section of the machine in FIG. 1.

The middle portion of the frame terminates in an upright wall 1a, FIGURE 3, and is formed with a lower forward extension covered from above by a plate 8 acting as a working table over which the material being sewn travels. A forward extension is defined at the front by a vertical wall 1b parallel with the wall 1a.

A cover plate 9 is screwed to an overhanging portion of the wall 1a overlying the working table 8. The cover plate 9 covers the mechanisms supported by the wall 1a and which are described hereafter and carries externally thereof a lever or arm 10 supporting a presser food 11.

An intermediate region on the lever 10 is acted upon by a rod 12 which is constantly urged downwardly by a spring 13. The lever and presser foot 11 are therefore constantly urged in the direction of a needle plate 14, FIGURE 2, which is flush with the working table.

Figure 4:
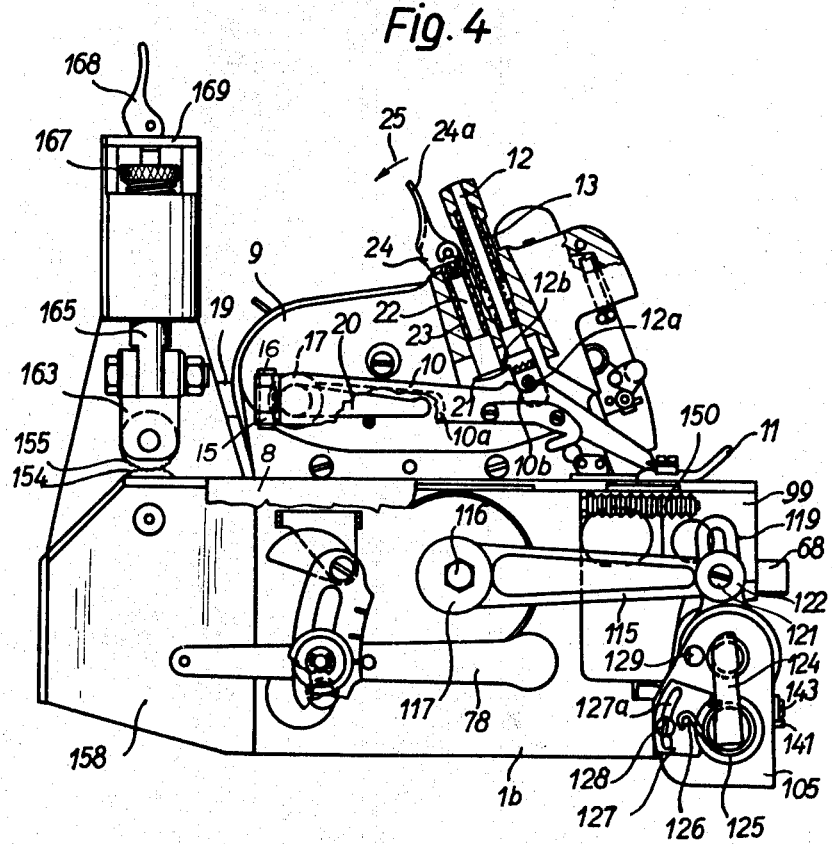
FIGURE 4 is an end view, partly in section, of the machine in FIG. 1.

The lever 10, FIGURE 4, ends oppositely the presser foot 11 as a fork 15. The fork 15 is hinged through the interposition of a pin 16 to a bored lug 17 securely fixed to the forward face of a pivot 18, FIGURE 2, extending parallel with the working plane 8 and journalled in the wall 1a of the middle frame portion. The pivot 18 extends beyond the opposite side of the wall 1a and carries at this end a lever 19 by means of which it can be rotated. At the end of the pivot 18 to which the lug 17 is secured, an arm 20, FIGURE 4, is attached. The arm 20 is accommodated in a recess 10a on a side of the lever 10 towards the wall 1a. The rod 12 carries in proximity to its bottom end a roller 12a acting on a shoulder 10b on the lever 10. Above the roller 12a the rod 12 is formed with a tooth 12b which is normally engaged from below by a collar 21 on a pivot 22 extending parallel with the rod 12 in a seat formed in the wall 1a, and urged downwardly by a spring 23. The top end of the pivot 22 is articulated between the arms of a fork 24 ending by a lever 24a. The fork is of cam shape so that by pressing the lever 24a and rotating it in the direction of the arrow 25 the pivot 22 is lifted.

The above described structure insures a constant pressure by the presser foot on the work being sewn and travelling over the needle plate, as well as the possibility of lifting the presser foot by acting on the lever 19 secured to the pivot 18. A further object is to release the presser foot 11 from the spring means urging it in the direction of the needle plate, for the purpose of moving it laterally by rotating the lever 10 about the pin 16, FIG. 22.

The main shaft 26 of the machine, FIGURE 3, is journalled in the rearward portion, which is likewise somewhat lowered, of the frame in the bearings 27 and in the forward wall 1b in a bearing 28. The shaft 26 is moreover intermediately supported by a bushing 29 secured to the frame and carries at its rear end 26a a pulley-flywheel unit 30. A drive belt, not shown, travels over the latter and is driven by a motor. The belt travels over a small arc over the periphery of the pulley 3 carried by the operating shaft for the pump in the case 2.

The portion of the shaft 26 between the bearings 27 and bushing 29 is provided with a crank transmitting motion through the connecting rod 31 and arm 32, FIGURE 15, to a top shaft 33 parallel with the shaft 26. The top shaft 33 carries at its forward end a crank pin 34 having fulcrumed thereto the middle portion of an arm 35, FIGURE 5. The rear end of the arm 35 is articulated by means of a pivot 36 to a link 37, hinged in turn to the wall 1a of the frame by means of a pivot 38. The forward end of the arm 35 is formed as a fork 39 articulated through a pivot 40 to a slide 41 slidably mounted on a guide bar 42 secured to the frame wall 1a. The slide 41 carries a needle A, FIGURE 1, for forming the overlock stitch.

Proportioning of the various components of the needle operating mechanism and operation of the said mechanisms are known per se and are for instance described in detail in U.S. Patent 3,176,640.

Figure 5:
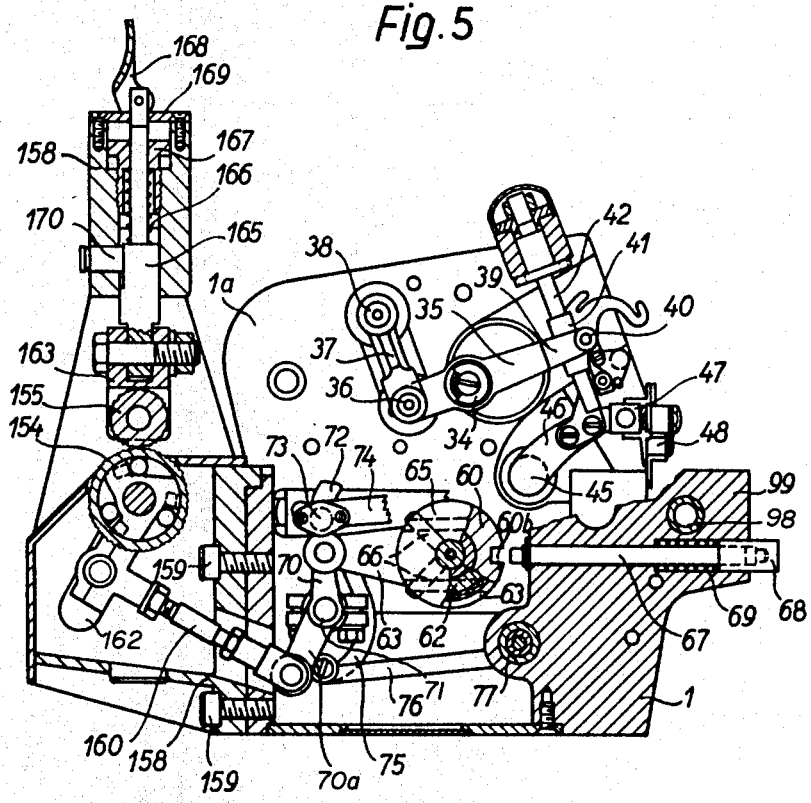
FIGURE 5 is a section view taken on line V—V of FIGURE 2.

Another crank is arranged beside the crank on the main shaft 26 driving the connecting rod 31. The other crank drives a connecting rod 43 transmitting motion to the device for cutting the fabric being sewn. The connecting rod 43 is articulated to a lever 44 keyed to the shaft 45, FIGURES 5 and 15, and is disposed parallel with the main shaft and is rotatably supported in the frame 1. One end of it extends through the wall 1a and carries in front of the wall an arcuated arm 46, FIGURE 5, provided at its end with a head 47 having secured thereto a top cutter 48. The cutter is secured through a strap 48b secured by a screw 48a, as described in the abovementioned United States Patent 3,176,640.

The correlation of the members effecting the movements of the needle and top cutter 48, respectively, is such that both the needle and the top cutter move during operation of the machine in full synchronism and in the same directions.

Other cranks are provided on both sides of the cranks effecting movement of the connecting rods 31 and 43, FIGURE 3, the first of these other crank, operates a connecting rod 49 articulated to an arm 50 fast with a transverse pivot 51 having secured thereto a supporting arm for the bottom looper 52. The other crank operates a connecting rod 53 articulated to an arm 54 secured to a transverse pivot 55 carrying a lever 56.

The lever 56 is hinged at its end to an arm 57 slidably mounted in an opening in a T-shaped head of a pivot 58. The pivot 58 is in turn mounted for oscillation in a bushing, not shown, secured in the frame by means of a screw. The end of the arm 57 extending upwardly carries a top looper 59 operating with the looper 52 and needle A in forming the overlock stitch. In order to form the two-thread overlock stitch the thread is fed to the needle and bottom looper 52. The top looper 59 is of special configuration with a fork-shaped tip to cooperate in knotting with the needle thread.

The section of the main shaft 26 between the bushing 29 and bearing 28 in the wall 1b carries a disc 60 provided on its side turned towards the bearing with a cylindrical extention 60a the outer circumference of which is eccentric to the axis of the main shaft. Coupling of the disc 60 provided with the eccentric extension 60a and main shaft is effected by means of a spring cutter 61 and is such that normally during operation of the machine the disc 60 is carried along in rotation by the main shaft, but is rotatable relatively to the latter when its rotation is prevented and a relatively high torque is simultaneously exerted on the main shaft. The cylindrical extension 60a on the disc 60 has fitted thereon an eccentric sleeve 62 acting as a crank pin for a connecting rod 63, FIGURES 2 and 3, operating the work feed dogs in a manner to be described hereafter. The inner through hole in the sleeve 62 is larger in diameter than the corresponding section of the main shaft 26. The sleeve 62 is moreover formed with a forward extension 62a provided with lateral flanges parallel with each other extending diametrically to the sleeve. The extension 62 which is therefore of T-shaped cross section, is slidably mounted in a diametrical guide formed in the face of a disc 65 keyed to the main shaft in proximity to the bearing 28 turned towards the sleeve 62. The disc 65 is fixed to the main shaft by means of screws 66, FIGURE 5.

The disc 60 has a circumferential notch 60b, FIGURE 5, cut therein. In front of the circumference of the disc 60 and radially thereto a rod 67 is slidably mounted in a suitable seat in the machine frame and can be pushed towards the circumference of the disc 60 by acting on a push button 68 extending from the side wall of the frame portion supporting the needle plate, against the action of a spring 69 which normally maintains the rod 67 spaced from the disc 60.

In order to vary the length of stroke of the connecting rod 63 it is sufficient to engage, by the rod 67, the notch 60b in the disc 60, with the machine stationary, by manually rotating the handwheel 30 secured to the main shaft of the machine. Upon engagement the stitch length corresponding to the instant position of the handwheel can be read on a graduated scale on the flywheel 30. In order to vary the stitch length the handwheel is rotated while maintaining the push button 68 in engaged condition until the desired stitch length is read on the graduated scale on the handwheel, FIGURE 2. By effecting such rotation of the handwheel 30, hence of the main shaft 26 and the disc 60 being kept stationary, a relative rotation of the disc is effected with respect to the main shaft, whereby the eccentricity of the periphery of the eccentric sleeve 62, which acts as a crank pin for the connecting rod 63, is varied. The greatest eccentricity which can be provided by the arrangement just described equals the sum of the individual eccentricities of the sleeve 62 and an eccentric tubular projection 60a on the disc 60. The small end of the connecting rod 63 is articulated to a fork 70 secured to a shaft 71, FIGURES 5, 13 and 14, mounted for oscillation in the walls 1a and 1b of the frame. The shaft 71, which extends parallel with the shaft 26, has likewise secured thereto an arcuate arm 72. A slide 73 is slidably mounted on the arm 72 and is provided on its side opposite the arm 72, with a pivot having articulated thereto a link 74. The pivot extends beyond the link and has articulated to its free end the top terminal portion of a curved arm 75. The end portion at the bottom of the latter is rotatably mounted on the free end of an arm 76 extending transversely of the shafts 71 and 26. The arm 76 is moreover secured to the shaft 77 parallel with the main shaft and extends to the outside through the wall 1b by a section carrying a swing lever 78, FIGURES 4 and 22, provided with means for retaining it in a predetermined position with respect to the frame, said means being described in detail for instance in Patent 3,176,640.

The other end of the link 74 is mounted for oscillation on a pivot 79 fast with the feed dog holder bar 80, FIGURE 6. The latter extends transversely of the main shaft 26 and is adjacent another feed dog holder bar 81 very similar to the former. The bars 80 and 81 are each formed with a lower bell crank projection 80a, 81a, respectively. The projections define guides fitted on the sleeve 82 which is keyed to the section 26b of the main shaft, which is slightly eccentric with respect to the axis of the said shaft and adjacent the bushing 29. Consequently, during rotation of the shaft 26 the bars 80, 81 are periodically simultaneously lifted and subsequently lowered. The bar ends opposite those carrying the feed dogs are in the form of forks 80b 81b, respectively. The forks encompass a block 83 mounted for oscillation on an eccentric pivot 84 fast with a pivot 85 rotatably supported by the frame and normally locked in a predetermined position by means of a screw 86, FIGURE 6. The bar 81 is connected by means of a pivot 87 and a link 88 to an arm 89 secured to the shaft 71. The shaft is arcuate and is formed with a slot 90 having slidable therein a pivot 91 to which the link 88 is articulated. The pivot 91 is retained in the individual selected position. The bars 80, 81 reach by their ends remote from the forks 80a, 81a into the clearance beneath the needle plate 14. Their movement in a lateral direction is prevented at this region by the provision of bell cranks 92, 93 secured to the frame, FIGURE 6. The bar 81 has secured thereto a quadruple feed dog, the bar 80 having secured thereto a double feed dog. The feed dogs are situated at the elevation of the corresponding openings cut in the needle plate 14 in which holes 94 are additionally bored for its attachment to the frame, FIGURES 17 and 19.

A notch 95 is cut in the edge of the needle plate turned towards the frame wall 1a and receives the top portion of a stationary cutter 96, see also FIGURE 16, which cooperates with the movable top cutter 48 in order to trim the edge of the work being sewn. The stationary cutter 96 is in the form of a thin blade secured to a support 97. The latter carries on its rear face a pivot 98 which when the support is assembled on the machine is fitted into a through hole in the portion 99 of the machine frame. The pivot 98 is secured in the hole in a predetermined position by means of a screw 100. A hole is also provided in the support 97 on the side remote from the stationary cutter and receives a pivot 101 parallel with the hole receiving the pivot 98 fast with the support 97 and secured to the abovementioned portion by means of a screw 102. The support 97 is moreover constantly urged in the direction of the free end of the pivot 101 by a spring 103 biasing the head of a pin 104 received by a hole parallel with the pivot 98.

By this structure the stationary cutter 96 can be moved transversely of the direction of feed of the sewn work and it can be positioned conveniently depending upon the selected spacing of the fabric edge and row of stitches.

The component parts of the machine cooperating in feeding the elastic band to the needle plate and removing it from the region at which the stitch is formed and the band is attached to the work being sewn, respectively, will now be described in detail.

The feed device comprises a cast iron support 105 for a pair of parallel milled rollers 106, 107, secured by means of screws 108, FIGURE 10, to the bottom portion of the frame in proximity of the wall 1b of the latter on the side of the machine on which the fabric to be sewn is placed on the working table 8.

The top or driving roller 106 is operated from the main shaft of the machine. The bottom or counter roller 107 is loosely mounted on an eccentric pin and is urged against the top roller 106 by spring means to constantly insure adherence of the band which is fed to the top driving roller 106. The structure of the mechanism transmitting motion from the main shaft to the roller 106 and of the feed device are as follows.

The end of the main shaft 26 within the supporting bearing 28 mounted on the frame wall 1b is somewhat smaller in diameter than the bore of the bearing and has fitted thereon a bushing 109, FIGURE 7. The latter is formed with a front notch 110 receiving a pin 111 fitted into the disc 65 guiding the T-shaped projection on the eccentric sleeve 62, FIGURE 3. The bushing 109 carries on its face remote from the end of the main shaft 26 a flange having an eccentric projection in the form of a disc 112. The projection 112 reaches into a circular seat in a disc 113 fast with a further bushing 114 which is eccentric to the abovementioned seat in the disc 113 which receives the disc-shaped projection 112 on the bushing 109. The bushing 114 acts as a pin to which one end of the connecting rod 115 transmitting motion to the top roller 106, is articulated through the interposition of an antifriction bearing. The components 109 and 112 to 115 described above are secured to the end of the main shaft 26 by means of a bolt 116 which is threaded into a tapped seat in the end of the main shaft. In order to remove the bolt the bore in the bushing 114 is formed with a circumferential enlargement which should be properly positioned during assembly of the parts and removal of the bolt 116.

A washer 117 beneath the bolt head acts as an abutment and prevents slipping off in an axial direction of the big end of the connecting rod 115 from the bushing 114. The periphery of the disc 113 is provided with a graduated scale cooperating with a fixed mark engraved in the front face of the flange on the bushing 109, expressing the amount of eccentricity of the bushing 114 with respect to the axis of the main shaft 26. The purpose of the mechanism just described is to vary the stroke of the connecting rod 115, hence the width of the pulse which is transmitted by the connecting rod 115 to the driving roller 106. This width can be further varied by displacing the fulcrum from the other end of the connecting rod 115 with respect to the axis of the roller 106.

To this end the small end of the connecting rod 115 is articulated to a pivot 118 held stationary in a slot 119a in an arm 119 coupled to the roller 106. The pivot 118 is locked to the arm 119 by means of a nut 120 and receives at its other end a screw 121 holding in position a washer 122 acting as an abutment preventing lateral slipping off of the small end of the connecting rod 115 from the pivot 118.

The bottom roller 107, which is smaller in diameter than the roller 106, is loosely mounted on a pivot 123, FIGURE 10, having end portions 123a and 123b rotatably mounted in the support 105 and coaxial with each other, but eccentric to the middle portion of the pivot 123 supporting the roller 107. With this structure acting on a lever 124 secured to the portion of the section 123a of the pivot 123 extending beyond the support 105, the roller 107 can be drawn towards and away, respectively, from the roller 106, the axis of which is fixedly positioned with respect to the support 105.

The lever 124 is acted upon by one end of a helical spring 125 coiled about the section 123a of the pivot 123, the other spring end being anchored to the support 105. The spring is so arranged that its torque tends to rotate the pivot 123 in a direction such as to maintain the roller 107 constantly close to the roller 106. By acting on the lever 124 the roller 107 can be drawn away from the roller 106 in order to effect insertion of the elastic between the rollers of the feed device.

According to a preferred embodiment, FIGURE 4, the end of the spring 125 nearer the support 105 for the rollers 106, 107 is fastened to a pin 126 extending from a segment 127 having cut therein an arcuated slot 127a, the center of which is situated on the axis of the projections 123a and 123b on the pivot 123. The segment 127 is secured by means of a screw 128 extending through its slot 127a to its associated face of the support 105. The advantage of this construction resides in the fact that on displacing the position of the segment 127, the tension of the spring 125 can be adjusted. The lever 124 carries moreover a tooth 124a which can be fastened to a pin 129 secured to the flank of the support 105 carrying the sector 127.

The arm 119 having articulated thereto the small end of the connecting rod 115, is secured by means of screws 130 to a unidirectional clutch cam 131, FIGURES 9 and 11, rotatably mounted on the shaft 106a on a unidirectional clutch arranged within the roller 106, and cooperating with three small clutch rollers 132, each of which is biased by a spring 133. On the other side, a further cam 134 is rotatably mounted within the roller 106 on the shaft 106a and is oriented in the same direction as the cam 131 and attached by means of screws 135 to a flange 136 provided with a fork-shaped projection 136a encompassing the section 123b on the pivot 123 supporting the bottom roller 107. The cam 134 cooperates with rollers 137 biased by springs not shown similar to the springs biasing the rollers 132 cooperating with the cam 131. The unidirectional clutch comprising the cam 131 and rollers 132 is arranged to cause the top roller 106 to be carried along in rotation when the connecting rod 115 performs its stroke in a direction opposite the feed of the work being sewn. Whereas the unidirectional clutch comprising the cam 134 and rollers 137 is so arranged as to brake the roller 106 when the connecting rod 115 performs its stroke in the direction of feed of the work being sewn, during which the unidirectional clutch comprising the cam 131 and rollers 132 does not transmit any motion to the top roller 106.

A small brake having jaws 138, 139 biased by a spring 140, FIGURE 12, is arranged in the small clearance between the cams 131 and 134. The jaws 138, 139 are fulcrumed about projections 135a on two of the screws 135 securing the cam 134 to the flange 136 anchored to the section 123b on the pivot 123 supporting the bottom roller 107, hence to the support 105.

This expanding jaw brake supplements the braking action by the cam 134 and its associated rollers 137, to prevent inertia from carrying along the roller 106 together with the roller 107 to perform a quick intermittent motion beyond the dead points of their stroke, whereby accuracy in feed of the ribbon would be adversely affected.

On the inlet side for the elastic band to the feed device the support 105 carries a plate 141 formed with a longitudinal slot in which two slides 142 are slidably mounted and can be retained in suitable positions by tightening screws 143.

Figure 23:
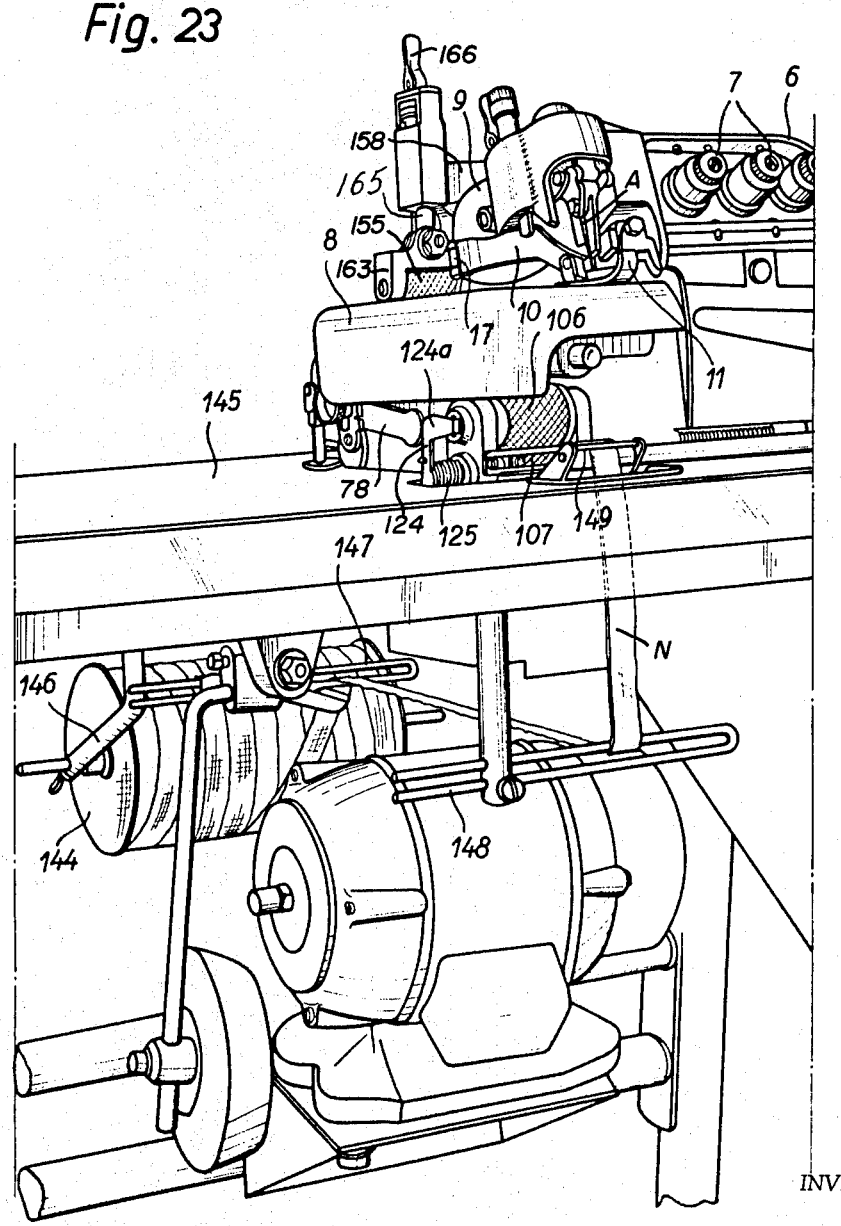
FIGURE 23 is a diagrammatic perspective view of the machine and its supporting table, showing the path of the band between the forward feed rollers and spool from which the band is unwound.

The elastic band N reaching the feed device unrolls from a spool 144, FIGURE 23, supported beneath the machine bench 145 by means of an inclined arm 146, the end of which acts as a pivot acting as a fulcrum for the spool 144.

The band unrolling from the spool 144 travels over forked guides 147, 148 arranged beneath the machine bench, is upwardly deflected on the guide 148 and reaches through an opening in the bench above the latter. The band is thereupon conveyed by a forked guide 149 towards the middle portion of the longitudinal slit in the plate 141, FIGURE 11, defined by the two slides 142, and is seized by the rollers 106, 107. On outlet from the feed device the band is once more upwardly deflected by the driving roller 106 and travels over a loose roller 150, the axis of which is perpendicular to the axis of the roller 106, and extending along the forward wall of the frame portion in which the members for supporting the stationary bottom cutter 96 are arranged. The loose roller 150 is moreover situated at an elevation such that the elastic band can reach into a transverse milling in the lower face of the needle plate 14. This milling F, FIGURE 18, has a leading side wall 14a perpendicular to the direction of feed of the work to which the elastic band should be attached, its opposite side wall 14b being inclined in the abovementioned direction. The passage for the elastic band, formed by the milling F therefore narrows towards the edge of the needle plate 14 in which the opening 95 for the bottom cutter 96 is cut. The milling F ends on this side by an edge 14c inclined through 45° to the direction of feed. With this configuration of the needle plate the elastic travelling in the milling F beneath the top face of the plate 14 can be bent about the edge 14c and reach the working table where it has superposed thereon the marginal portion of the work being sewn, the edge of which has been previously trimmed by the cutters 48 and 96. The inclined edge 14c is formed with a small semicircular recess 14d for the needle to extend therethrough. This recess is positioned in such manner that the elastic has the needle driven therethrough at two points after the needle has been driven through the fabric, still at the same spacing from the edge of the elastic remote from its edge guided along the wall 14a of the milling F. The width of the work portion which is superposed on the elastic and sewn by the needle depends of course upon the position of the cutters 48 and 96. The position of the inclined edge 14c is moreover such that the elastic is carried along by two at least of the adjustable stroke feed dogs extending through the slots 14a, 14f out of the set of four slots cut in the needle plate 14 for the teeth on as many feed dogs to reach therethrough, the stroke of the feed dogs determining the stitch length, such feed dogs being otherwise referred to as stitch feed dogs. The plate 14 is moreover formed with two slots 14g for the teeth in the so-called differential feed dogs engaging the fabric only to extend therethrough. In order to suit the structure of the needle plate 14 for attachment to the particular fabric being sewn of elastics of various width, the lower portion of the plate beneath the set of holes for the stitch feed dogs, is formed with a seat for slidably arranging therein in the direction of feed a lower perforated plate 151. The latter can be adjustably positioned in the direction of feed of the work in order to avoid linear displacements of the band in a direction opposite needle recess 14d to avoid danger of failure by the needle to sew the elastic.

Finally, in order to clear the bottom looper from the elastic, the latter is supported on its section between the loose roller 150 and inclined edge 14c of the needle plate 14 by a bridge piece comprising a plate 153 secured by means of two screws to the lower face of the needle plate.

In order to keep the elastic reaching the sewing region submitted to a certain tension obtained by adjusting the steps of the rollers 106, 107 with respect to the rate of feed transmitted to the elastic by the stitch feed dogs, against sliding in a direction opposite feed, a device is provided at the region at which the sewn work leaves the working table 8 in order to maintain the elastic band constantly tensioned, this device supplementing feed by the feed dogs. The device acts synchronously with the stitch feed dogs; however, as distinct from the latter, it never releases the elastic which cannot therefore withdraw and annul its initial tension. The device comprises a pair of milled rollers 154, 155, the bottom roller 154 of which is a driving roller and is operated from the mechanism moving the feed dogs, the top roller 155 acting as an abutment roller and being urged against the roller 154 by the action of adjustable spring means, the contact line of the rollers being situated slightly above the elevation of the working table. The rollers 154, 155 are rotatably mounted on pivots 157, 157, the pivot 156 being directly supported by a support 158 secured by means of screws 159 to the wall of the machine frame opposite the wall to which the elastic feed device is secured.

The driving roller 154 receives motion through a link 160 having a spherical eye engaging through a ball-headed pin 161 an arm 162 transmitting motion to the bottom roller 154 through a longitudinal slot 162' in the arm.

The small end of the connecting rod 160 is of fork shape and receives motion from an extension 70a on the forked lever 70, FIGURE 5, driven by the link 63 operated by the adjustable eccentric sleeve 62 fitted on the main shaft 26.

The driving roller 154 is similar in structure to the roller 106 and shall not be described in detail, considering moreover that it is clearly visible in FIGURE 8, in which all its various components are denoted by the same reference numerals distinguishing corresponding parts of the structure in the roller 106, with the prime "'." The only difference distinguishing the structure in the roller 154 resides in the fact that the fork 136'a on the flange 136' encompasses a pivot 164 fitted into the support for the rollers 154, 155, instead of the end of the pivot on which the counter roller is rotatably mounted.

The counter roller 155 is carried by a fork 163 articulated to the lower end of a piston 165 movable within a cylindrical seat in the top overhanging portion of the support for the rollers 154, 155. The piston 165 is downwardly biased by a spring 166 bearing on the bottom of a threaded collar 167 screwed into a tapped seat in the overhanging portion of the support for the rollers 154, 155. The threaded collar 167 is formed with a middle through bore through which the reduced end of the piston 165 reaches above the top of the overhanging portion. The top end of the piston 165 has articulated thereto an eccentric forked lever 168 bearing against a plate 169 secured to the top of the support in order to permit lifting of the fork carrying the top roller 155 as required for inserting between the rollers 154, 155 the elastic at the start of the sewing operation.

The piston 165 is formed with a circumferential axial milling receiving the head of a guide pin 170 carried by the roller support in order to maintain the top roller 155 correctly oriented. By the above described structure the stitch feed dogs feed the work with the elastic sewn thereto at a constant rate defined by a preselected initial desired adjustment, while the provision of the differential feed dog acting on the fabric alone, and the stroke of which is variable during operation of the machine, affords the possibility of establishing differential feed ratios of the fabric and elastic. A further advantage of the above described arrangement resides in the fact that the movement of the rear feed rollers 154, 155 is strictly dependent upon the movement of the stitch feed dogs so that, on each variation of the stitch length an equivalent increment or reduction in the feed stroke of the rear driving roller 154 occurs.

Figure 2:
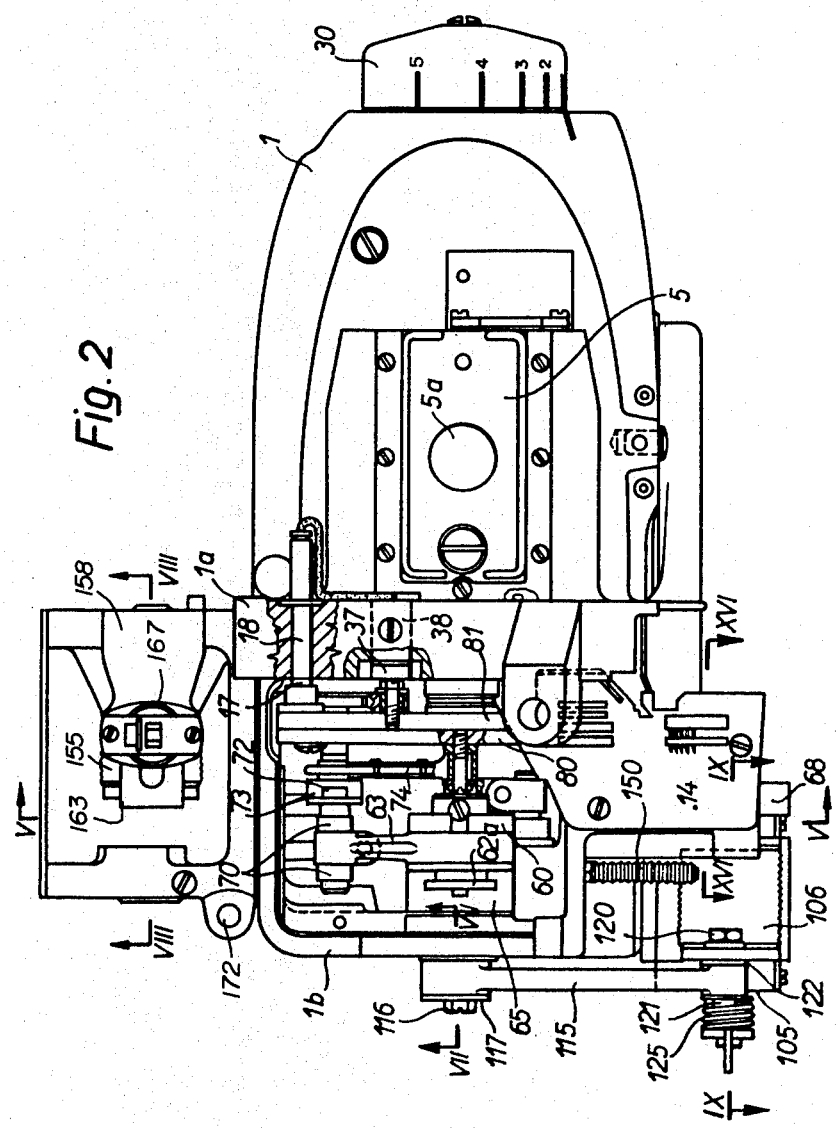
FIGURE 2 is a plan view of the machine in FIG. 1 the presser foot, needle bar, supporting mechanism for the cutters of the cutting device and plate acting as a working table being removed.

The plate 8 acting as a working table is mounted for oscillation about a vertical pivot 171 received by a tab 172 on the support 158, FIGURES 2 and 22, and can be moved to its position shown in FIGURE 22 for giving access to the internal underlying members of the machine. The plate is provided with flanges covering the device which feeds the elastic band and controls therefor, thereby clearing them from the fabric being sewn. The elastic extending beneath the plate 8 does not hinder the operator's movements either, who can freely attend to his main task consisting in handling the fabric to be elasticated.

It will be understood that the details of the machine described and illustrated can be widely varied. For instance, the supports 105, 158 can, if necessary, be made integral by casting with the machine frame 1.

What I claim is:

1. In an overlock sewing machine for attaching bands and the like to fabric edges, and having a frame provided with an upright surface and a lower forward extension, a plate for use as a working table superposed on said forward extension, and a needle plate flush with said table, said needle plate having a needle hole, a needle bar for carrying a needle, a presser foot arm, a fabric cutting device comprising a movable element carried by said upright surface, a threaded bottom looper and a threadless top looper arranged beneath said needle plate and disposed to cooperate with the needle to form a two thread overlock stitch, a presser foot secured to said presser foot arm, fabric transporting means cooperating with said presser foot, and comprising means arranged beneath the working table and said needle plate for feeding the band in a tensioned condition to a zone in which stitches are formed in a direction perpendicular to that of the stitch formation, means on said needle plate for deflecting the band through 90° to extend in said direction of the stitch formation and for overlaying it over a portion of the upper face of the needle plate extending from the needle hole in the direction of the stitch formation, means for removing the band and the fabric sewn thereto from the working table, and said means on said needle plate comprising an edge portion inclined to the direction of the stitch formation and extending from the needle hole in the needle plate to the needle plate edge, said inclined edge being directed towards said upright surface and being displaced in the direction of the stitch formation with respect to said needle hole in the needle plate.

2. An overlock sewing machine as claimed in claim 1, wherein said means for feeding the elastic band to said zone at which the stitches are formed comprise a guide consisting in a transverse milling provided at the lower face of the needle plate and defined at its one end by said inclined edge portion of the needle plate.

3. Machine as claimed in claim 2, further comprising a bridge piece comprising a plate secured to the lower face of the needle plate closing said guide milling in the bottom face of the needle plate to clear the bottom looper from the band travelling within said guide milling.

4. Machine as claimed in claim 2, further comprising a perforated plate slidably mounted in the direction of feed in a seat formed in the lower face of the needle plate and secured to said needle plate for adjustable positioning along said seat and disposed forming the side wall of the milling at a section near the edge inclined to the direction of feed to cause the needle to be driven through the band even where the band width is considerably smaller than the width of said guide milling.

5. Machine as claimed in claim 2, in which said inclined edge comprises a small edge in a position substantially at the middle of the band inlet end of the milling, said recess being substantially semicircular and situated in the path of travel of the needle.

6. Machine as claimed in claim 1 comprising a main shaft and in which said means for feeding the band to the sewing and feed region comprises a support fast with the machine frame, a pair of feed rollers superposed on each other carried by said support, a double unidirectional coupling incorporated by the top roller for transmitting rotation to said top roller from the main shaft of the machine, an eccentric pivot rotatably mounted in said support for supporting the bottom roller loosely mounted, and spring means biasing said bottom roller to insure adherence of the rollers to the band travelling therebetween.

7. Machine as claimed in claim 6, in which said feed rollers extend parallel with the main shaft of the machine, said support being arranged so that the rollers feed the band towards a low portion of the machine frame laterally offset from the needle plate.

8. Machine as claimed in claim 7, comprising a lever rotatably mounted on the shaft supporting the top roller, a unidirectional joint connecting said lever and said roller, a pivot carried by said lever and a link articulated to said pivot, an eccentric bushing carried by the main shaft and extending beyond the forward wall of the machine situated beneath the working table and having hinged thereto the other end of said link.

9. Machine as claimed in claim 8, comprising an arm connected with said top roller and having a longitudinal slit for slidably receiving said pivot, and a nut for fastening said pivot in desired position on said arm.

10. Machine as claimed in claim 6, wherein means are provided for adjusting tension of the said spring means biasing said bottom roller in the direction of said top roller.

11. Machine as claimed in claim 6, wherein stop means are provided for maintaining the said bottom roller spaced from the said top roller.

12. Machine as claimed in claim 6, wherein one of said unidirectional joints incorporated by said top roller acts as a brake on the latter when the other joint does not transmit motion to said roller.

13. Machine as claimed in claim 6, including a brake to prevent movements of said top roller due to inertia.

References Cited by the Examiner

UNITED STATES PATENTS

| | | | |
|---|---|---|---|
| 1,227,756 | 5/1917 | Dahl | 112—162 |
| 1,277,008 | 8/1918 | Weis | 112—2 |
| 1,548,909 | 8/1925 | Seymour | 112—162 |
| 1,810,617 | 6/1931 | Maier | 112—112 |
| 2,095,647 | 10/1937 | Mann | 112—2 |
| 2,521,360 | 9/1950 | Gerstein | 112—214 |
| 2,596,168 | 5/1952 | Piper et al. | 112—214 |
| 2,922,166 | 1/1960 | Peachey | 112—2 |
| 3,016,028 | 1/1962 | Schreck et al. | 112—214 X |

JORDAN FRANKLIN, *Primary Examiner.*